United States Patent [19]

Senff

[11] Patent Number: 4,842,644
[45] Date of Patent: Jun. 27, 1989

[54] SILVER RECOVERY METHOD

[76] Inventor: Anthony N. Senff, P.O. Box 354, Mt. Vernon, Wash. 98273

[21] Appl. No.: 916,184

[22] Filed: Oct. 7, 1986

[51] Int. Cl.$^4$ ............................................. C22B 11/04
[52] U.S. Cl. ............................... 75/118 P; 75/101 BE; 75/109; 75/118 R; 423/24; 423/25; 423/42; 210/688; 210/719; 210/912
[58] Field of Search ............... 210/688, 719, 137, 902, 210/912; 75/101 BE, 109, 118 R, 118 P; 423/24, 25, 42

[56] References Cited

U.S. PATENT DOCUMENTS 4,325,732  4/1982  Woog ................................. 75/118 P
4,610,724  9/1986  Weir et al. ......................... 75/118 R

*Primary Examiner*—Ivars Cintins
*Attorney, Agent, or Firm*—Hughes & Multer

[57] ABSTRACT

Methods of and apparatus for recovering silver and other metals from solutions containing compounds of those metals. The solution being treated is pumped upwardly under pressure and at a constant rate through a reaction mass or medium to promote ion exchange reactions between the metal of interest in the solution and the material making up the reaction mass and thereby precipitate the metal of interest from the solution being treated.

3 Claims, 3 Drawing Sheets

SILVER RECOVERY METHOD

TECHNICAL FIELD OF THE INVENTION

The present invention relates to novel, improved methods and apparatus for recovering silver and other metals from photo processing and other solutions and, more particularly, to methods and apparatus of the character just described which can be used to particular advantage in applications where only a small volume of solution is involved.

At the present time, the most important application of the novel methods and apparatus disclosed herein is in the recovery of silver from solutions such as those just identified, both as a pollution control measure and as a source of income. The principles of the invention will be developed primarily with reference to the foregoing application with the understanding that this is being done for the sake of brevity and clarity and is not intended to limit the scope of what I regard my invention.

BACKGROUND OF THE INVENTION

Various solutions which become loaded with silver as they are used are employed in the processing of photographic negatives and prints, X-rays, lithographs, and other items of a comparable character. Exemplary of such solutions are fixers; bleaches; wash water; the bleaches, fixers, and stablizers employed in waterless developing processes; and the tailings from electrolytic cells.

It is often desirable to recover the silver from the spent solution. This may be desirable or necessary for pollution control purposes or because the concentration of silver in the spent solution is high enough to make the recovery of the silver economically desirable.

Heretofore, units designed to recover silver from solutions of the character described above have typically operated on an ion exchange principle. The spent, silver-containing solution percolates through a gravity flow cartridge containing a spool of continuously wound steel wool under reaction conditions which cause the silver ions to undergo exchange reactions with ferrous ions of the steel wool matrix. This reduces the silver to an elemental form, the metal plating out on the steel wool and/or accumulating on the bottom of the gravity flow cartridge.

One disadvantage of heretofore available silver recovery units of the character just described is that various insoluble compounds tend to precipitate out of the solution being processed as the exchange reactions proceed, especially if the volume of solution being processed is low and the solution is therefore flowing only slowly through the recovery unit. These precipitates tend to clog the pores in the recovery medium, and this leads to channeling by virtue of the solution being forced into a restricted number of paths and dissolving holes through the reaction medium. Channeling is undesirable because it decreases the recovery medium surface area which is available to the spent solution, thereby decreasing the efficiency of the recovery unit. At the same time, the solution being processed flows faster through the reaction medium, decreasing the contact time and thereby even further decreasing the efficiency of the recovery process.

Also, plugging of the interstices in the recovery medium of a gravity flow recovery unit further reduces the efficiency of the unit by reducing the surface area of the reaction medium available to the solution being processed and by impeding the flow of the solution therethrough, apart from the adverse effect on efficiency which any channeling might produce.

Yet another drawback of conventional cartridges of the character described above is that they are very much subject to leakage which is undesirable because of the resulting mess and because the leaking solution may be of a corrosive or other harmful character.

Also, conventional cartridges have the disadvantage that they can not be pressurized to eliminate the problems discussed above and associated with gravity flow because the cartridge or container housing the reaction medium will burst.

Another decided disadvantage of typical silver recovery systems of the conventional, cartridge type is the lack of adequate control over the rate at which the solution being treated flows to the ion exchange cartridge. This lack of adequate flow rate control also contributes to pore clogging and the resultant drop in efficiency in conventional silver recovery units of the ion exchange type.

It is also a disadvantage of those units that the continuous filament reaction media they employ is relatively inefficient as far as the reactions involved in the ion exchange recovery of silver are concerned.

Still other processes and devices for recovering and precipitating metals such as those with which I am concerned are disclosed in U.S. Pat. Nos. 1,349,086 issued Aug. 10, 1920, to Murphy for METAL PRECIPITATOR AND SEPARATOR; 2,905,323 issued Sept. 22, 1959, to Megesi for APPARATUS FOR RECOVERY OF SILVER FROM SPENT PHOTOGRAPHIC SOLUTIONS; 3,043,432 issued July 10, 1962, to Megesi for APPARATUS FOR RECOVERY OF SILVER FROM SPENT PHOTOGRAPHIC SOLUTIONS; 3,630,505 issued Dec. 28, 1971, to MacKay for SILVER RECOVERY; 3,692,291 issued Sept. 19, 1972, to MacKay for SILVER RECOVERY; 3,744,995 issued July 10, 1973, to MacKay for SILVER RECOVERY; and 3,840,217 issued Oct. 8, 1974, to MacKay for SILVER RECOVERY. Without exception, the foregoing patents are concerned with processes and systems of the gravity flow type although Megesi '432 does make the statement that "auxiliary pumping means" were used in some undisclosed manner "in commercial installations . . . to force the fluid through the apparatus." Therefore, the just-identified, heretofore patented systems would have those disadvantages of gravity flow systems discussed above.

Furthermore, the patented systems employ as reaction media such undesirable materials as steel wool (Megesi '323 and Megesi '432), which was discussed above; turnings and chips, which have the disadvantages that flow through the reaction mass is apt to be sluggish and that the surface area accessible to the solution being processed is apt to be less than optimal; and screening, which is also undesirable because it, too, is relatively inefficient.

In addition, the foregoing patented devices do not appear to be of a construction which would resist leakage or bursting if operated under pressure. Consequently, the patented devices could not be employed in the manner discussed above and found by me to be advantageous.

Nor do the patented systems have control systems which like mine, would be capable of maintaining a constant rate-of-flow of the liquid being treated and of thereby keeping precipitates from plugging the interstices in the reaction medium and/or the reaction vessel inlet or outlet.

SUMMARY OF THE INVENTION

I have now invented, and disclosed herein, certain new and novel methods and apparatus for recovering silver (and other metals) from solutions in which those metals are present.

In general, the novel metal recovery processes disclosed herein involve the recovery of elemental metal via an ion exchange reaction between the metal being recovered and an appropriate reaction medium and a consequent depositing of the metal being recovered on the exposed surfaces of the reaction medium or on the bottom of the reaction vessel.

Insoluble precipitates tend to form in the course of these reactions. They are kept from plugging the interstices of the reaction medium by: (1) causing the solution being processed to flow under pressure through the reaction medium, and (2) causing that solution to flow through the reaction vessel at a rate which is constant and high enough to keep the precipitates from settling out of the solution.

This maintenance of a constant flow rate under pressure also keeps the solution being processed from dissolving holes through the reaction medium and thereby forming channels through which the solution might flow without contacting that medium.

At the same time, the efficiency of the ion exchange (or replacement) reactions is promoted by using a reaction medium which is a mass of multitudinous, interdigitated fibers typically fabricated from a ferrous metal. This both inhibits interstitial plugging and promotes contact between the solution being processed and the reaction medium.

In applications where the volume of solution being processed warrants, two or more cartridges, both containing the appropriate reaction medium, can be employed in series. This permits the rate of flow needed to prevent plugging and channeling to be maintained while the residence time of the solution is kept long enough to insure that the wanted ion exchange reactions are completed.

The apparatus in which my novel metal recovery processes are carried out is characterized, in one respect, by resistance to leakage and to bursting at pressures which will typically be on the order of 120 psi or higher. A metering pump is employed in conjunction with a holding tank to insure that the rate of flow of the solution being treated through the reaction vessel remains constant, and level actuated switches in the holding tank are utilized to control the operation of the metering pump. An additional level controlled switch activates an independently powered overflow alarm, alerting the operator that a malfunction has occurred or that the unit has not been plugged in; and a total-elapsed-time timer is provided so that the operator will know when the reaction mass is apt to have been exhausted and should be replaced.

OBJECTS OF THE INVENTION

From the foregoing, it will be apparent to the reader that one important and primary object of the present invention resides in the provision of novel, improved methods and apparatus for recovering a selected metal from a solution containing ions of that metal.

Other also important but more specific objects of my invention reside in the provision of methods in accord with the preceding object:

which are more efficient than the competing processes in use today, particularly in applications in which the volume of fluid being processed is relatively small;

which, in conjunction with the preceding object, promote efficiency by providing a controlled time of residence of the solution in the reactor in which it is treated by maintaining a constant rate of flow of the solution through the reactor;

which employ a mass of discrete, randomly oriented, interdigitated fibers of an appropriate material as a reaction medium;

which are capable of reducing the metal ion content of the solution being treated to as low as 0.2–0.5 parts per million;

which are particularly adapted for the recovery of silver from such diverse solutions as the wash waters from photographic processes; fixers and other solutions employed in developing photographic films and papers, X-rays, and lighographic plates; and the aqueous tailings from electrolytic celss; and which can also be employed to recover gold and other metals from solutions containing ions of those metals.

Still other important, but specific objects of the present invention reside in the provision of apparatus as identified in the above set forth primary object:

which is efficient and reliable;

which, in conjunction with the preceding object, is capable of promoting efficiency of metal recovery by maintaining a constant rate of flow of the solution being treated under pressure through a reaction mass composed of a material having multitudinous interstitial passages formed therethrough;

in which, in conjunction with the preceding object, a positive displacement type metering pump is employed to effect the flow of the solution through the reaction medium at the wanted constant rate;

which is relatively simple and concomitantly cost effective in terms of capital investment and maintenance;

which is equally easy to set up and install;

which is versatile in that: (1) it is composed of a collection or holding tank unit and a reactor that can be located at a considerable distance from the first-named unit, and (2) two or more reactors can be arranged in series to increase the capacity of the apparatus without decreasing the residence time for which the solution being treated is in contact with a reaction medium;

which, in applications in which silver is the metal being recovered, employs a reaction medium composed of multitudinous, discrete, randomly oriented, interdigitated fibers of a ferrous metal;

which has a novel alarm system for warning of conditions that might result in the metal ion containing solution being discharged from the reactor before the specified residence time has elapsed;

which has a level responsive switch arrangement for controlling the flow of the metal ion containing solution to the reactor in which the metal is recovered from the solution being processed; and which has a holding or collection tank for volumes of the metal ion containing solution exceeding those that can be circulated without delay through the reactor at the selected constant rate.

DETAILED DESCRIPTION OF THE INVENTION

Figure 1:
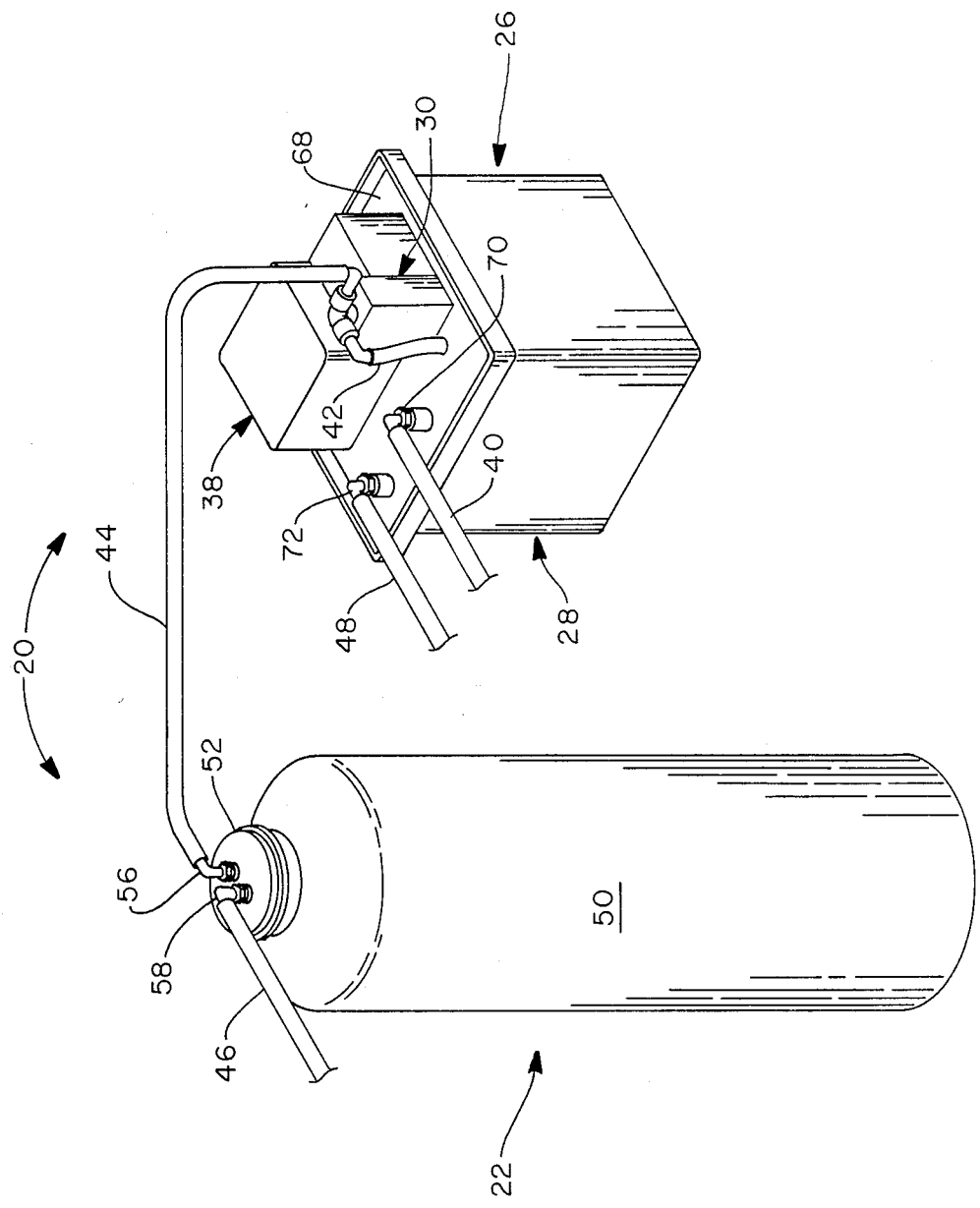
FIG. 1 is a pictorial view of metal recovery apparatus embodying, and constructed in accord with, the principles of the present invention.
Figure 2:
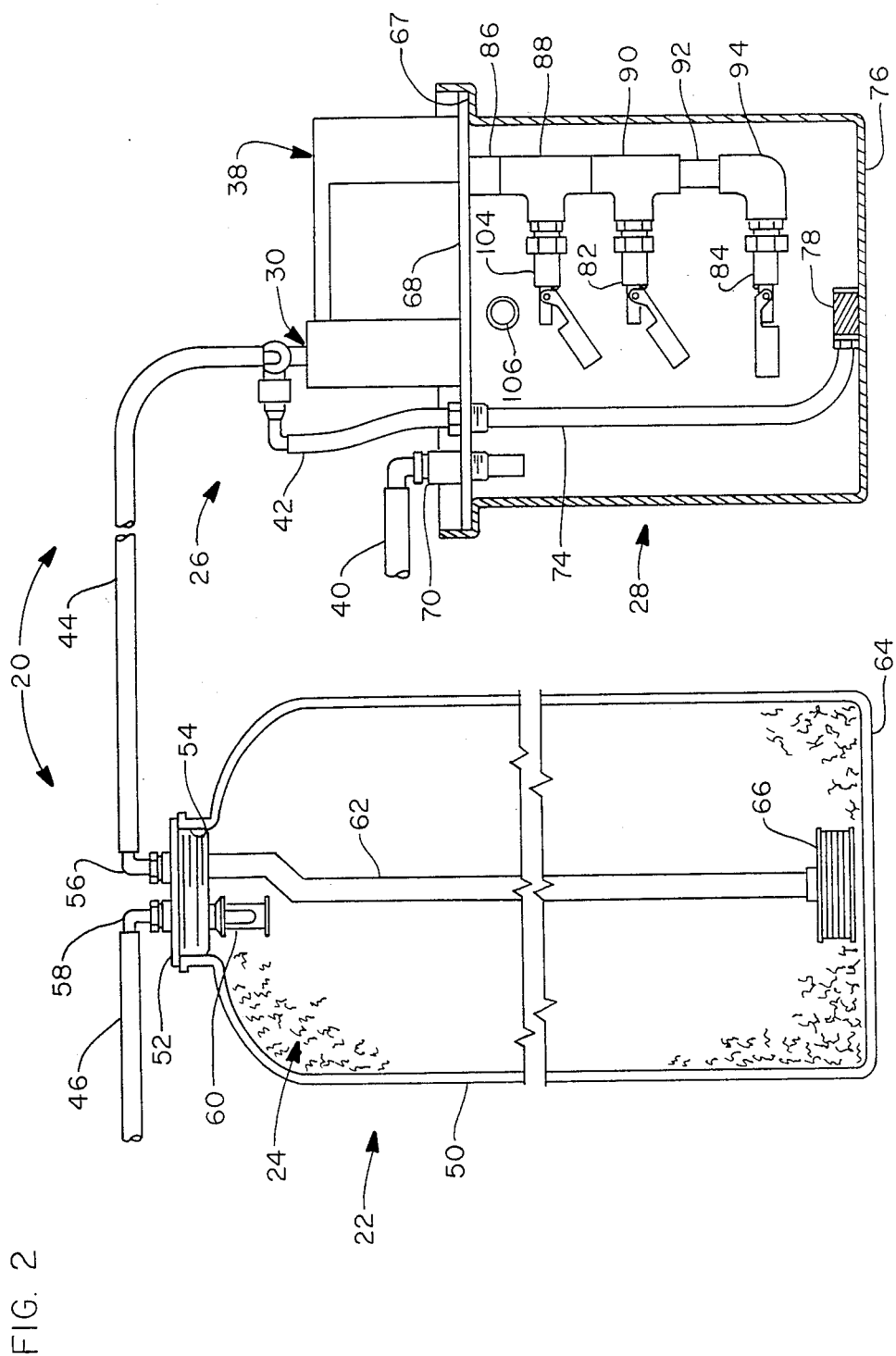
FIG. 2 is a side view of the apparatus of FIG. 1 with the housings of that apparatus' two units or subassemblies being broken away to show the internal components of those subassemblies.

Referring now to the drawing, FIGS. 1 and 2 depict a system 20 constructed in accord with the principles of the present invention and designed to recover silver or another metal from a solution of that metal.

The major components of system 20 are: (1) a recovery cartridge 22 houseing a mass 24 of an elemental or other material which can react with the metal being recovered to precipitate the latter from the solution being processed; and (2) a second, independent unit 26 which includes: a holding tank 28; a positive displacement, bellows type metering pump 30 driven by an electric motor 31 (see FIG. 3) for causing the solution being processed to flow under pressure and at a constant rate from the holding tank to, and through, recovery cartridge 22; a level responsive, switch-actuated system 32 (see FIG. 3) for controlling the operation of pump 30; an alarm system 34 which warns the operator of an overflow condition in holding tank 28; a total-elapsed-time timer 36 which is employed to warn the operator that the recovery cartridge 22 is apt to be exhausted and should be replaced; and a casing 38 in which various components of the pump control 32, alarm system 34, and timer 36 are housed.

Also included in metal recovery apparatus 20 and associated with cartridge 22 and unit 26 are an inlet line 40 to holding tank 28, a line 42 connecting the holding tank to the inlet side of pump 30, a transfer line 44 connecting the discharge side of the pump to recovery cartridge 22, and a line 46 for discharging processed fluids from the recovery cartridge.

As is shown in FIGS. 1 and 2, a second inlet line 48 is also preferably connected to holding tank 28 so that solutions emanating from two separate sources can be routed to the holding tank at the same time. This is particularly useful in photographic applications, for example, in which two silver laden solutions such as a spent fixer and wash water may be generated at the same time.

Because of the head on the inflowing solution generated by metering pump 30, recovery cartridge 22 can be located at a considerable distance from holding tank unit 26 simply by increasing the length of solution transfer line 44. This is an advantage of considerable practical importance as it can make it possible to minimize the handling of the recovery cartridges, which become relatively heavy as the reaction masses they contain become depleted and are replaced by the recovered elemental metal and other substances.

The major component of recovery cartridge 22 is a pressure vessel 50. This pressure vessel 50 will typically be fabricated of a fiberglass reinforced polyethylene. In one actual embodiment of my invention this container is 36 inches tall and 12 inches in diameter, and it is capable of withstanding pressures of 120 psi without bursting. These cartridges are available from Park International Corp., Long Beach, Calif.

Also included in recovery cartridge 22 is an externally threaded closure member 52 which keeps liquid contained in the pressure vessel from leaking through a complementary, internally threaded access opening 54 at its upper end, even though that fluid may be under pressures as high as 120 psi. Closure member 52 also supports, without leakage, an inlet fitting 56 to which the solution transfer line 44 leading from the discharge side of metering pump 30 to cartridge 22 is connected and an outlet fitting 58 to which the discharge line 46 from the recovery unit is coupled.

Connected in series with outlet fitting 58 on the interior side of pressure vessel 50 is a filter 60. This filter keeps precipitated metals and other solids from being carried out of the recovery cartridge with the process fluid.

Finally, recovery cartridge 22 includes a more-or-less centrally located downflow conduit 62 extending from inlet fitting 56 to adjacent the bottom 64 of the recovery cartridge and a sparger 66 connected to, and in fluid communication with, the lower end of downflow conduit 62.

Solutions to be processed and pumped to recovery cartridge 22 by pump 30 flow downwardly through conduit 62 and are discharged into the bottom of reaction mass 24 through sparger 66. Because the inflowing solution is discharged through sparger 66 under pressure, it percolates upwardly through the reaction mass. As this occurs, the silver or other metal ions of interest in the solution react with the metal making up the reaction mass, liberating the wanted metal in an elemental form. This metal plates out on the reaction medium to some extent but more commonly collects in a sludge that forms in the bottom of cartridge 22 as the recovery process proceeds.

Post-processing levels of the metal in the treated solution as low as 0.2 to 0.5 part per million are readily reached. Such levels are low enough to comply with any existing or proposed pollution control levels known to me. On the other hand, virtually complete recovery of the involved metal can be attained in applications where metal recovery is the goal of the process.

The reaction medium 24 housed in the illustrated recovery cartridge 22 is a loosely packed mass of interdigitated fibers of a ferrous material, these fibers typically being on the order of three-fourths inch in length. This particular reaction medium is designed for applications involving the recovery of silver from a silver laden solution such as one of those identified above.

This wanted, interdigitated distribution of the fibers making up the reaction mass can be easily and economically achieved by blowing the chopped fibers into pressure vessel 50 and around downflow pipe 62 through the opening 54 in the upper end of the pressure vessel. As mentioned above, this orientation of the fibers is a significant feature of the present invention. It inhibits channeling and increases the surface area available to the solution being processed, thereby decreasing the residence time needed to reduce the metal ion concentration in the solution to a specified level or, conversely, lowering the level to which that concentration can be reached in a given amount of time.

Referring still primarily to FIGS. 1 and 2, the holding tank 28 of the unit 26 with which recovery cartridge 22 is associated will typically be fabricated of an appropriate polyethylene or other polymer. In the exemplary embodiment of the invention illustrated in the drawing, this tank has a seven gallon capacity.

Supported on a ledge 67 at the upper end of tank 28 is a cover or lid 68. This cover also serves as a mount and/or support for the positive displacement metering pump 30; fittings 70 and 72 for inlet lines 40 and 48; the casing 38 housing pump control system 32, alarm system 34, and timer 36; and a pump suction line 74 which extends from pump inlet line 42 to the bottom 76 of the holding tank. There, a filter 78 is fitted to the suction line to keep solids in the holding tank from flowing to, and possibly damaging, components of the metering pump 30.

Pumps that are suitable for my purposes include the bellows type metering pumps made by Waltham Chemical Pump Corporation of Waltham, Mass. Such pumps are capable of producing the wanted results even in applications where the volume of solution being processed is only 15-20 gallons per week or less. At these processing rates, gravity flow systems become very inefficient and are apt to be plugged by precipitates formed in the course of recovering the wanted metal from the solution.

Pumps of the character just described also have the advantage that the delivery rate can be varied, allowing the residence time of the solution being processed to be optimized. In circumstances where the incoming flow of solution is too great to be accommodated in a single cartridge for the optimum residence time, a second (or second and third) recovery cartridge can be connected in series with cartridge 22 so that the total contact time between the solution and the reaction medium can be kept at the optimum.

Figure 3:
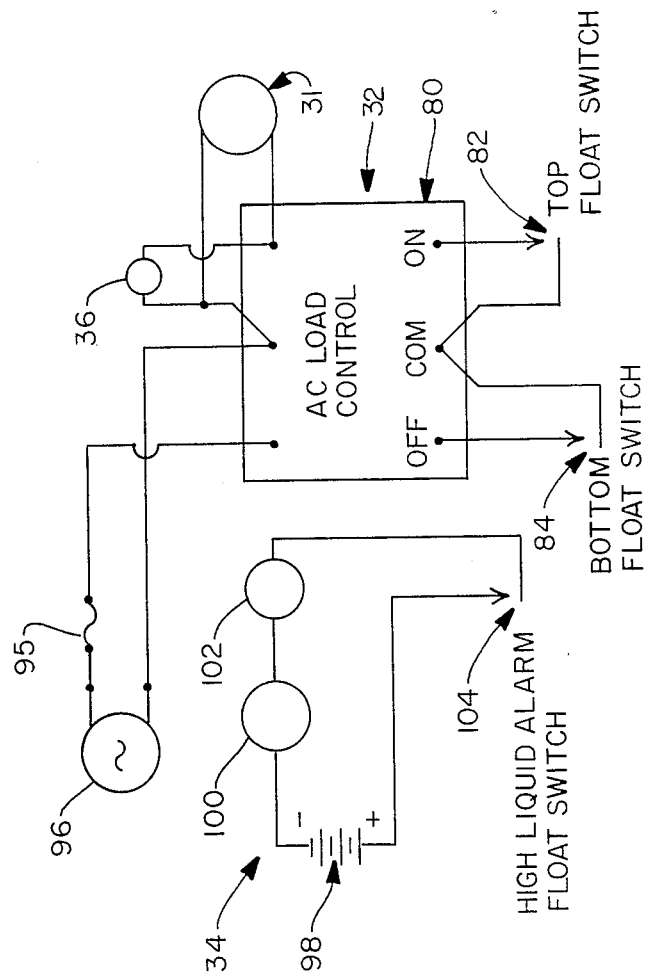
FIG. 3 is a wiring diagram for the apparatus of FIG. 1.

Referring now primarily to FIGS. 2 and 3, the control 32 for positive displacement measuring pump 30 includes an A.C. load control 80 obtained from the Gems Sensors Division of DeLaval, Farmington, Conn., and two liquid level responsive switches 82 and 84. Suitable switches of this character are available from Compac Engineering, Inc., Paradise, Calif.

Physically, level-operated switches 82 and 84 are supported from the cover 68 of recovery system unit 26 by a series of tubular conduits and fittings 86. . . 94 with switch 82 located above switch 84 (in a typical installation, switches 84 and 82 will respectively be positioned two and four inches above the bottom 64 of pressure vessel 50). These conduits and fittings house the leads from switches 82 and 84, isolating them from the solution in holding tank 28 and thereby preventing the leads from posing an electrical shock hazard.

Electrically, as shown in FIG. 3, switches 82 and 84 are respectively connected to "ON" and "OFF" terminals of A.C. load control 80 and to a common terminal of that system component. The load control is also connected through a fuse 95 to a conventional A.C. power source 96 and to the positive displacement metering pump 30.

With switches 82 and 84 and pump 30 connected to A.C. load control 80 as shown in FIG. 3, pump 30 will be activated to effect a constant rate flow of solution from holding tank 28 into and through the reaction medium 24 in metal recovery cartridge 22 when the solution reaches the level in holding tank 28 where the upper, "ON" switch 82 is located. Subsequently, pump 30 will be deenergized when the level of the solution in the holding tank has been lowered to that level where the lower, "OFF" switch 84 is located.

By activating pump 30 only when the solution in holding tank 28 has reached the upper of the foregoing levels and then not deactivating the pump until the lower level has been reached, a minimum volume of solution will be pumped through recovery cartridge unit 22 each time pump 30 is actuated. This volume is so chosen that, in each operating cycle of pump 30, enough solution is pumped through cartridge 22 at the preselected constant rate of flow to keep precipitates from accumulating in the interstices of reaction mass 24 and/or from plugging inlet fitting 56 or outlet fitting 58.

As is also shown in FIG. 3, the total-elapsed-time timer 36 is connected to A.C. load control 80 in parallel with pump 30. Consequently, the time displayed by timer 36 is equal to the time for which pump 30 has been operated in each operating cycle of the timer. It has been found that the useful life of the reaction medium 24 in metal recovery cartridge 22 remains consistent from cycle to cycle. Consequently, when the time indicated by timer 36 suggests that the recovery cartridge 22 has reached the end of its useful service life, this information will be available to the operator and alert him to replace the cartridge.

It is important, in this respect, that the cartridge be replaced before all of the reaction mass is consumed in the ion exchange reactions. This leaves a layer of the reaction medium at the top of the cartridge, and that layer serves to keep metal liberated in the cartridge from escaping with the processed fluid.

Referring still to FIGS. 2 and 3, the overflow alarm system 34 is employed to alert an operator that an abnormal, overflow condition exists-for example, that solution is flowing into holding tank 28 faster than it is being pumped out or that pump 30 is not operating because pump control system 32 has not been plugged into A.C. power source 96, the pump has malfunctioned, etc.

Overflow alarm system 34 includes, in electrical series, an independent power source such as a battery 98; an alarm 100 such as a buzzer; a manually operable switch 102; and a third, level responsive switch 104. Physically, the latter is supported from the cover 68 of holding unit tank 28 by the same series of conduits and couplings 86. . . 94 employed to support the above discussed level responsive switches 82 and 84 from that cover and for the same reason; viz., to provide a watertight routing for the electrical leads to the level responsive switch.

With manual switch 102 closed, alarm 100 will sound whenever the level of the solution in holding tank 28 reaches the level of level responsive switch 104, and the alarm will remain energized until an operator opens manual switch 102 or the level of the solution in the holding tank drops below the level of that switch.

Associated with, and slightly above the level of, switch 104 is an overflow outlet 106. Typically, this outlet will be connected by an appropriate line (not shown) to a location where the solution can be safely disposed of and/or held for later processing.

As was suggested above, the solutions that can be successfully processed by the novel process, and in the novel apparatus, disclosed herein include: wash waters laden with silver released from photographic films and prints, developers; fixers, and other solutions for photographic, X-ray, and lithographic processes including those more recently developed ones which do not require an aqueous wash or rinse; and the tailings from electrolytic plating units. Also, the novel apparatus and processes disclosed herein can equally well be adapted to the recovery of gold and other metals - e.g., by replacing the ferrous reaction media with one composed of a conventional ion exchange resin or granular activated carbon if the recovery of gold is involved. Therefore, to the extent that they do not expressly do so, the appended claims are not intended to restrict the inventions therein embraced to the processing of any particular solution or to the recovery of any particular metal from the solution being processed.

Also, the invention may be embodied in specific forms other than that disclosed above without departing from the spirit or essential characteristics thereof. The embodiment of the invention disclosed above is therefore to be considered in all respects as illustrative and not restrictive. The scope of the invention is instead indicated by the appended claims, and all changes which come within the meaning and range of equivalency of the claims are intended to be embraced therein.

What I claim as my invention is:

1. In a method of recovering a selected metal from a solution containing ions of such metal:
   (a) the step of effecting a flow of said solution under pressure through the interstices of a reaction medium which is housed in a reactor and is composed of a material that:
      (i) is reactable with said ions to precipitate said metal, and
      (ii) has multitudinous interstitial flow passages extending therethrough;
   (b) said solution being so caused to flow at a constant rate through said reaction medium as to provide a controlled time of residence of said solution in the reactor and also keep said solution from dissolving said reaction medium in a manner which could result in the formation of channels in said material through which said solution might flow without contacting the reaction medium and said rate of flow of said solution being high enough to keep precipitates formed by reactions between said ions and said reaction medium from settling out of said solution and plugging interstices of the reaction medium; and
   (c) said reaction medium being provided in said reactor by the step of blowing discrete fibers of the material of which the reaction medium is composed into said reactor to thereby produce in said reactor a reaction medium which is composed of multitudinous, discrete, randomly oriented, and interdigitated fibers of said material.

2. A method of recovering a metal as defined in claim 1 wherein the metal to be recovered is silver and the reaction medium is composed of multitudinous, discrete, randomly oriented, and interdigitated fibers of a ferrous metal.

3. A method of recovering a selected metal as defined in claim 1 wherein the metal ion-containing solution is: a wash water from a photographic, X-ray, or lithographic process; a fixer or other solution from such a process; a metal ion-laden solution from a waterless film developing process; or the aqueous tailings from an electrolytic cell.

* * * * *